United States Patent [19]

Nakamura et al.

[11] 4,421,081
[45] Dec. 20, 1983

[54] SPARK-IGNITION INTERNAL COMBUSTION ENGINE

[75] Inventors: Ken Nakamura, Kawasaki; Tadashi Nagai; Masanori Takami, both of Yokosuka, all of Japan

[73] Assignee: Nissan Motor Co., Ltd., Yokohama, Japan

[21] Appl. No.: 232,858

[22] Filed: Feb. 9, 1981

[30] Foreign Application Priority Data

| Feb. 12, 1980 | [JP] | Japan | 55-15855 |
| Feb. 13, 1980 | [JP] | Japan | 55-16434 |
| Feb. 14, 1980 | [JP] | Japan | 55-17151 |
| Mar. 27, 1980 | [JP] | Japan | 55-39438 |
| Mar. 27, 1980 | [JP] | Japan | 55-39439 |

[51] Int. Cl.³ ............................................. F02P 15/02
[52] U.S. Cl. .................................. 123/310; 123/661
[58] Field of Search .................. 123/310, 657, 661

[56] References Cited

U.S. PATENT DOCUMENTS

| 2,718,221 | 9/1955 | Leach ................................... 123/661 |
| 4,144,860 | 3/1979 | Muranaka et al. ................. 123/310 |
| 4,202,306 | 5/1980 | Nakajima et al. .................. 123/310 |
| 4,296,720 | 10/1981 | Nakanishi et al. ................. 123/661 |

FOREIGN PATENT DOCUMENTS

| 1926613 | 6/1977 | Fed. Rep. of Germany . |
| 54-68006 | 8/1979 | Japan . |
| 54-101205 | 9/1979 | Japan . |
| 1204434 | 9/1970 | United Kingdom . |
| 1280857 | 7/1972 | United Kingdom . |
| 1427775 | 3/1976 | United Kingdom . |
| 1544012 | 4/1979 | United Kingdom . |
| 1560430 | 2/1980 | United Kingdom . |
| 1570940 | 7/1980 | United Kingdom . |
| 1575938 | 10/1980 | United Kingdom . |

OTHER PUBLICATIONS

Pontiac Motor Division, "1959 Pontiac Shop Manual", Feb. 1959, p. 6–1.

*Primary Examiner*—Craig R. Feinberg
*Attorney, Agent, or Firm*—Schwartz, Jeffery, Schwaab, Mack, Blumenthal & Koch

[57] ABSTRACT

A spark-ignition internal combustion engine having a combustion chamber, comprises intake and exhaust valves disposed on a cylinder head wall surface and positioned generally symmetrical with each other with respect to the center axis of the bore of an engine cylinder, at least first and second squish areas which are located respectively in first and second sections of the combustion chamber which sections are defined by dividing the combustion chamber into two by a first vertical plane containing the centers of the intake and exhaust valves, and a spark plug whose tip section is disposed on the cylinder head wall surface and positioned in said first section of the combustion chamber thereby enabling use of high compression ratio without causing engine knock.

11 Claims, 34 Drawing Figures

SPARK-IGNITION INTERNAL COMBUSTION ENGINE

BACKGROUND OF THE INVENTION

1. Field of the Invention

This invention relates to an improvement in the combustion chamber construction of a spark-ignition internal combustion engine, and more particularly to a combustion chamber construction improvement in a high compression ratio reciprocating piston internal combustion engine.

2. Description of the Prior Art

In internal combustion engines used for automotive vehicles, fuel consumption characteristics and economy have become important from the view points of energy saving and exhaust gas purification. In order to attain low fuel consumption characteristics, it is necessary to increase the combustion efficiency and the thermal efficiency of the engine. For this purpose, it has now known that the combustion in the combustion chambers of the engine can be improved by strengthening the swirl of intake air or by using a dual spark plug ignition. In addition, in order to increase the thermal efficiency and thereby improve fuel consumption characteristics, it has been proposed to raise the compression ratio of the engine over the conventional range of of 7.5 to 9.0.

BRIEF SUMMARY OF THE INVENTION

According to the present invention, a spark-ignition internal combustion engine is formed with each of its combustion chambers having at least first and second squish areas which are located in first and second sections of the combustion chamber, which are defined by dividing the combustion chamber into two parts by a vertical plane containing a straight line connecting the centers of intake and exhaust valves positioned generally symmetrical with each other with respect to the cylinder bore center axis. At least one spark plug is positioned in the vicinity of one of the squish areas.

By virtue of the above-mentioned squish areas, squish flow of air-fuel mixture is produced in the combustion chamber to generate squish turbulence which achieves faster combustion in the combustion chamber. Additionally, end gases can be cooled by relatively cool combustion chamber walls which form the squish areas. Consequently, the end gases are less likely to ignite spontaneously, thereby preventing engine knock. This enables the use of higher compression ratios in the engine which greatly contributes to improving its thermal efficiency and fuel consumption characteristics. Therefore, with the engine constructed according to the present invention, better fuel economy can be attained, maintaining while high power output performance and driveability.

Preferably, the engine according to the present invention is provided with a second spark plug in the combustion chamber in a position generally opposite to the above-mentioned spark plug. The second spark plug functions to achieve faster combustion of the air-fuel mixture in the combustion chamber. Additionally, the combustion chamber walls defining the squish areas may be formed with at least one recess in the vicinity of the spark plugs so that good flame propagation in the combustion chamber is not prevented by the combustion chamber walls. Good flame propagation may be further improved by forming a shallow recess on the crown top surface of a piston associated with the combustion chamber. Furthermore, effective cooling of the end gases may be achieved by forming a water jacket in the combustion chamber walls defining the squish areas in such a manner that the water jacket approaches the squish areas as closely as possible.

BRIEF DESCRIPTION OF THE DRAWINGS

The features and advantages of the spark-ignition internal combustion engine according to the present invention will be more clearly appreciated from the following description taken in conjunction with the accompanying drawings in which like reference numerals and characters designate the correspodning parts and elements throughout all the figures, and in which.

DETAILED DESCRIPTION OF THE INVENTION

Figure 1:
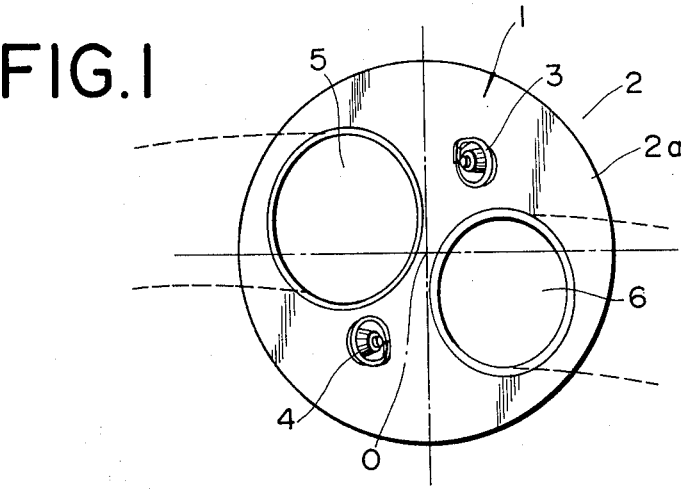
FIG. 1 is a plan view of a cylinder head bottom surface defining a combustion chamber in a conventional spark-ignition internal combustion engine.

To facilitate understanding the present invention, a brief reference will be made to a conventional internal combustion engine, depicted in FIG. 1. Referring to FIG. 1, a simple shape combustion chamber 1 is defined by the circular wall surface section 2a of a cylinder head 2, closing an upper end of an engine cylinder bore, (not shown). On this surface section 2a, two spark plugs 3, 4 are positioned generally symmetrical with each other relative to the center axis O of the cylinder bore, and additionally intake and exhaust valves 5, 6 are so positioned that their centers lie generally symmetrical with each other relative to the cylinder bore center axis O. With an engine having such a combustion chamber construction, if the compression ratio is raised by merely increasing the height of a piston crown, engine knock is liable to rise due to the spontaneous ignition of end gases or unburned air-fuel mixture separating from a flame front during high load engine operation. Such knocking will ultimately damage the engine. In order to avoid such engine knock, some considered enriching the air-fuel mixture supplied to the combustion chamber or diminishing the spark timing to a level which does not cause engine knock. However, the former measure results in deteriorated fuel consumption, and the latter measure results in lowered engine power output which leads to deteriorated driveability and fuel consumption, thereby greatly diminishing the effects of raising compression ratio of the engine.

In view of the disadvantages of the conventional engine combustion chamber construction described above, the present invention is now proposed. Reference is made to FIGS. 2 to 5, and more particularly to FIGS. 2 and 3, wherein a first embodiment of an internal combustion engine is illustrated by the reference numeral 10. The engine 10 comprises an engine cylinder 12 (or cylinders) formed in a cylinder block 14. A piston 16 is reciprocably disposed in the cylinder 12 as usual. An upper end of the cylinder 12 is closed by a cylinder head 18 which is secured through a gasket 20 on the upper surface of the cylinder block 14. A combustion chamber 22 which is circular in section is formed between the crown 17 of the piston 16 and the circular wall surface section 18a of the cylinder head 18 whose periphery corresponds to the periphery of the combustion chamber 22 and the circular periphery of the cylinder bore 12.

Figure 2:
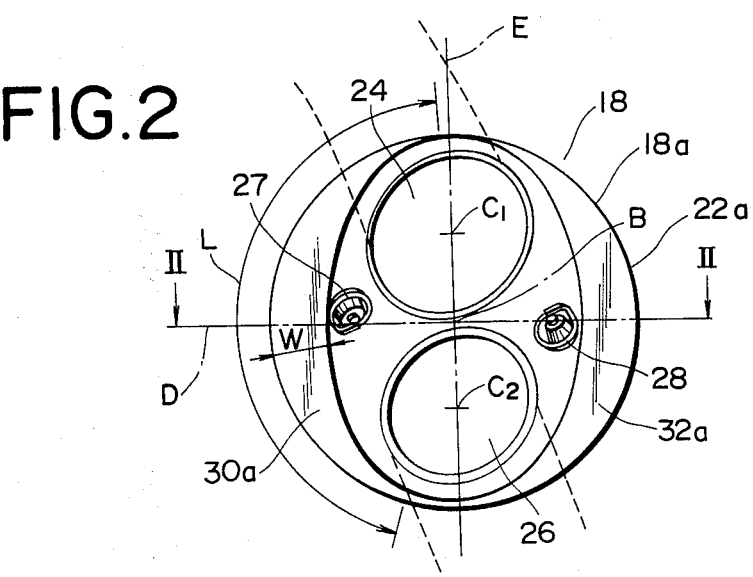
FIG. 2 is a plan view of a cylinder head bottom surface defining a combustion chamber in a first embodiment of a spark-ignition internal combustion engine in accordance with the present invention.

As shown in FIG. 2, intake and exhaust valves 24, 26 are disposed to be seatable on valve seats (not shown) formed on the circular wall surface section 18a of the cylinder head 18, and so positioned that their centers $C_1$ and $C_2$ lie generally symmetrical with respect to each other relative to the extension the cylinder bore center axis B. Two spark plugs 27, 28 are screwed through the cylinder head 18 and their tip sections or electrodes project into the combustion chamber 22. The tip sections of the spark plugs are preferably positioned to be generally symmetrical relative to the cylinder bore center axis as viewed from the direction of cylinder bore center axis, and located along an imaginary vertical plane D which is perpendicular to or crosses an imaginary vertical plane E which contains the intake and exhaust valve centers $C_1$ and $C_2$. The cylinder head 18 is formed at its circular wall surface section 18a with two lower or squish area forming portions 30, 32 (crescent shaped in section) each having a flat or squish surface 30a, 32a, and a remaining bathtub shaped major combustion space 33. The two lower portions 30, 32 form two crescent shaped (in section) squish ares 34 and 36, respectively, between the surfaces thereof and the top surface 17a of the piston crown 17. As clearly seen from FIG. 2, each squish area 34, 36 extends along the combustion chamber periphery 22a from the vicinity of a plane (near the intake valve 24) where the combustion chamber periphery 22a crosses the vertical plane E to the vicinity of an opposite place (near the exhaust valve 26) where the combustion chamber periphery 22a crosses the vertical plane E. In other words, the two squish areas 34, 36 are respectively formed in two sections of the combustion chamber; the sections are defined by dividing the entire combustion chamber 22 into two by the vertical plane E, and positioned generally symmetrical with respect to the vertical plane E. Additionally, the width W of each squish area 34, 36 (in section) in the radial direction of the combustion chamber 22 is at its largest in the vicinity of the spark plug 27, 28, i.e., at a central section of the squish area positioned between the spark plug and the combustion chamber periphery 22a as viewed from the direction of cylinder bore center axis B. The outer peripheral distance L of each squish area 34, 36 along the combustion chamber periphery 22a is within a range from ⅓ to ½ of the length of the cylinder bore periphery. It is to be noted that the compression ratio of this engine 10 is set at a value (for example 10) higher than the conventional range of from about 7.5 to 9.0 of the conventional spark-ignition internal combustion engines.

The manner of operation of the engine with the thus arranged combustion chamber will be explained hereinafter in comparison with the conventional engine as shown in FIG. 1. In the conventional engine, if the compression ratio is raised, the air-fuel mixture within the combustion chamber becomes high in temperature and pressure in the latter half of the compression stroke during high load engine operation. Furthermore, the heated and compressed end gases are subjected to the radiant heat of flame to abruptly expand with the rapid growth of the flame after ignition by spark plugs. This strongly compresses the end gases and raises the temperature thereof, by which the end gases becomes liable to spontaneously ignition. However, according to the present invention, the above-discussed problem in the conventional engine is solved as follows: Near the top dead center at compression stroke of the piston 16, the squish areas 34 and 36 are formed between the squish surfaces 30a, 32a and the piston crown top surface 17a. Therefore, in the vicinity of the end of compression stroke, the end gases or unburned gases lying near the combustion chamber periphery 22a are squeezed out of these squish areas 34 and 36. The squish gases flow toward the center of the combustion chamber from the outside of the spark plugs 27 and 28, thereby producing so-called squish turbulence in the combustion chamber 22. This increases the combustion rate. Additionally, since the end gases or unburned air-fuel mixture are cooled by the relatively low temperature squish surfaces 30, 32 and piston crown top surface 17a, the spontaneous ignition of the end gases before the flame reaches them is effectively suppressed.

The advantageous effect obtained by the present invention will be explained hereinafter with reference to results from experiments conducted on an engine such as that shown in FIGS. 2 and 3 having a compression ratio of 10 and conventional engine with a combustion chamber construction as shown in FIG. 1 and having a compression ratio of 8.5. The conditions comprised an engine speed of 2000 rpm with the throttle in the fully opened position. It is to be noted that all the engines used in the experiments whose results are shown in this specification are of 4-cylinder type having a displacement of 1770 cc.

Figure 4:
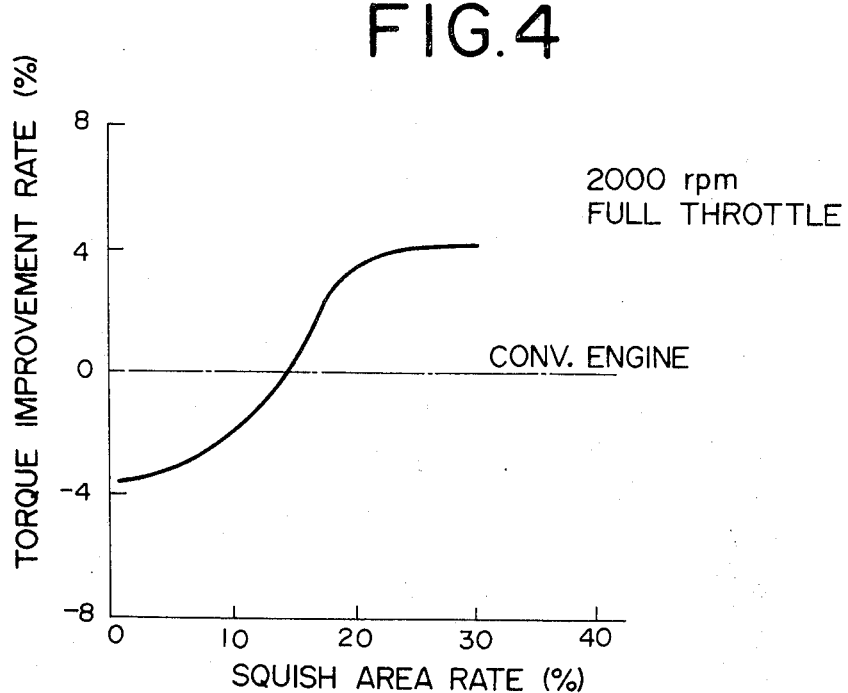
FIG. 4 is a graph showing the relationship between the engine torque improvement rate of the engine FIG. 2 over the conventional engine and the squish area rate.

FIG. 4 shows the engine torque improvement rate (%) of the engine according to the present invention over the conventional engine when the squish area rate is varied during high load engine operation. The squish area rate means the rate (%) of the total cross-sectional areas of the squish area 34 and 36 with respect to the cross-sectional area of the cylinder bore 12, i.e., the value obtained by the calculation of [(the total cross-sectional areas of the squish areas 34, 36/the cross-sectional area of the cylinder bore 12)×100]. FIG. 4 demonstrates that, with the engine according to the present invention, engine torque was greatly improved over the conventional engine since engine knock was effectively suppressed by virtue of the squish turbulence of the air-fuel mixture in the combustion chamber 22. Additionally, FIG. 4 demonstrates that the effect of the squish turbulence was effectively exhibited when the squish area rate was greater than about 15%.

Figure 5:
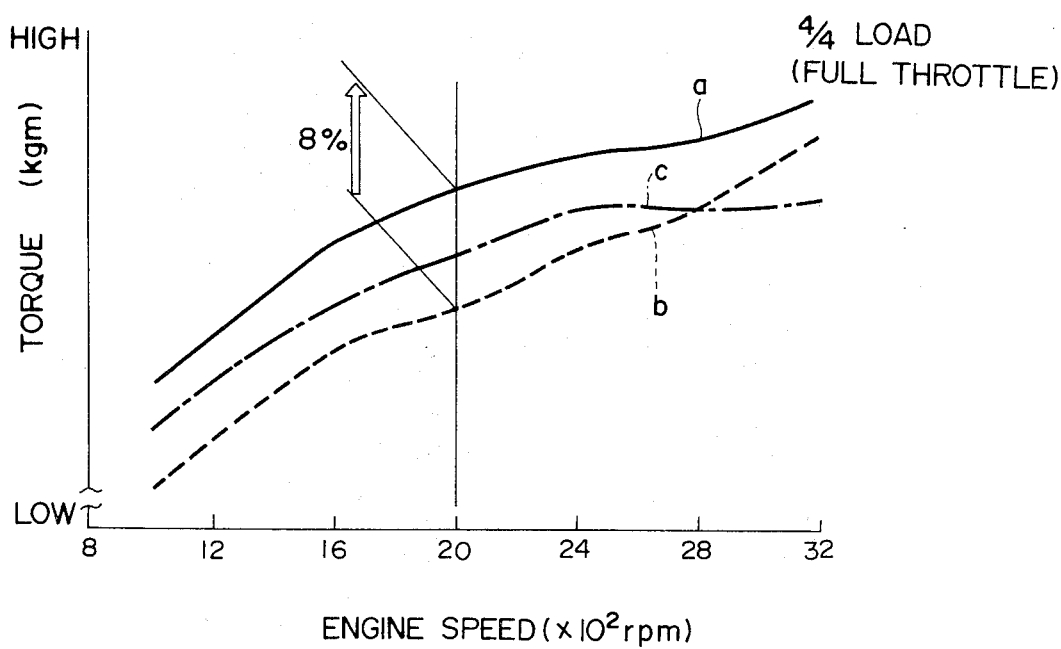
FIG. 5 is a graph showing the power output characteristics of various engines including the engine of FIG. 2.

FIG. 5 shows the power output characteristics of the engine (indicated by a curve a) according to the present invention in comparison with a conventional engine (indicated by a curve c) whose compression ratio is 8.5 and another conventional engine (indicated by a curve b) which was the same as the conventional engine except its compression ratio was 10. The engine power output (brake torque) characteristics in FIG. 5 was measured at a so-called trace knock level (or trace knock ignition timing) which is an allowable limit of engine knock and under the experimental conditions of full load and fully opened throttle. The engine according to the present invention which was used for this experiment had a squish area rate of 29% and compression ratio of 10. FIG. 5 demonstrates that, with an engine according to the present invention, the output engine torque was higher compared with a conventional engine, and was as much as 8% higher as compared with a conventional engine whose compression ratio is 10 at an engine speed of 2000 rpm.

As will be appreciated from the above, according to the present invention, at least one squish area is formed outside of the spark plug and along the periphery of the combustion chamber in order to generate the squish turbulence in the combustion chamber. As a result, engine knock can be effectively suppressed even in the case where the compression ratio is higher than usual, thereby improving engine torque characteristics. This prevents driveability and fuel consumption deterioration, and in fact improves the fuel consumption rate which is an advantage over other high compression ratio engines.

Figure 3:
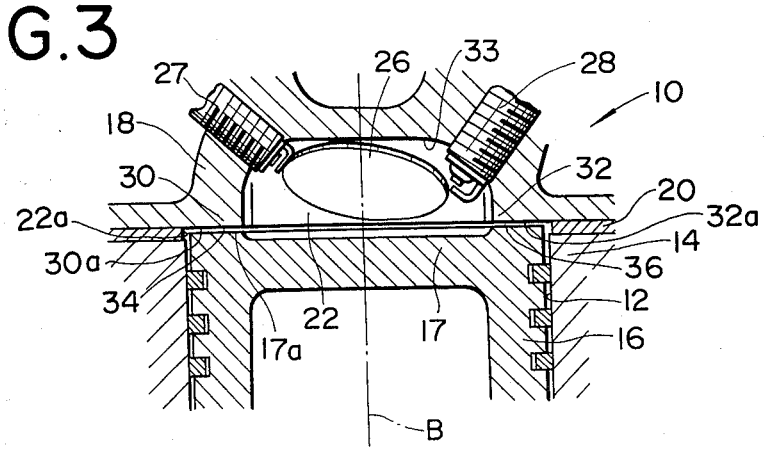
FIG. 3 is a vertical section view showing a combustion chamber construction, taken substantially along the line II—II of FIG. 2.
Figure 6:
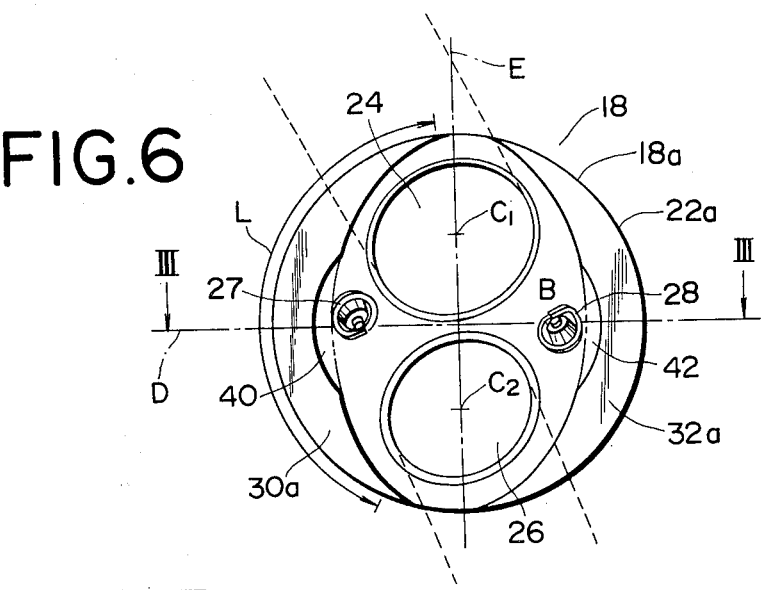
FIG. 6 is a plan view of a cylinder head bottom surface defining a combustion chamber in a second embodiment of the engine according to the present invention.
Figure 7:
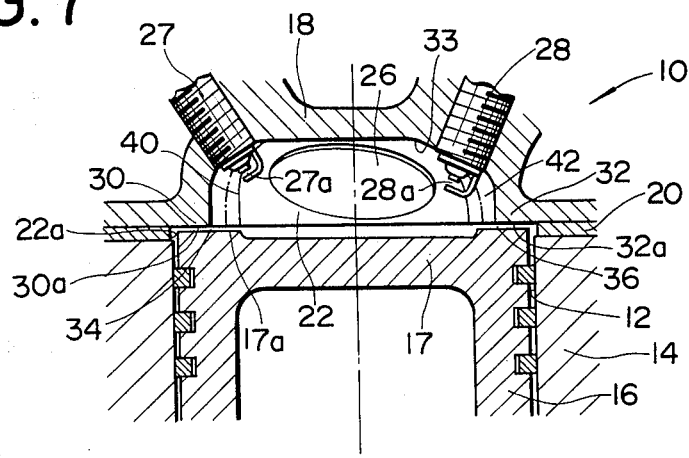
FIG. 7 is a vertical section view showing a combustion chamber construction, taken substantially along the line III—III of FIG. 6.

FIGS. 6 and 7 illustrate a second embodiment of the engine 10 which is similar to the first embodiment shown in FIGS. 2 and 3 with the exception that the two lower portions 30 and 32 of the cylinder head 18 are formed with two recesses or cutout sections 40 and 42 in the vicinity of the two spark plugs 27, 28, respectively. Each recess 40, 42 has a generally spherical surface which is considerably spaced from the spark plug 27, 28 as compared with the arrangement of FIGS. 2 and 3.

With this arrangement, the generally spherical recess 40 and 42 are formed in the vicinity of the spark plugs 27 and 28, respectively, so that a low temperature wall portion does not exsist around each spark plug. Such a wall portion may prevent good flame propagation or flame front movement in the combustion chamber. As a result, with the embodiment of FIGS. 6 and 7 the flame front movement is effectively carried out to obtain good combustion in the combustion chamber of the engine. Experiments demonstrated that this effect was especially significant during low load engine operating condition as shown in FIG. 8.

Figure 8:
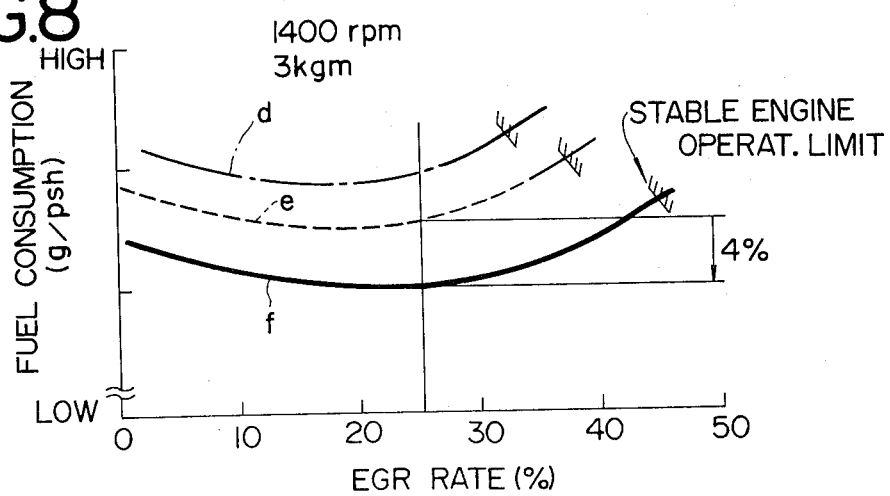
FIG. 8 is a graph showing the fuel consumption characteristics of various engine including the engine of FIG. 6 during partial load engine operation.

FIG. 8 shows the experimental result of fuel consumption (g/psh) corresponding to a partial load engine operating condition or a vehicle steady state cruising at 40 Km/h, on the variation of EGR rate (the weight rate of the exhaust gas recirculated back to the combustion chamber with respect to the intake air). The graph of FIG. 8 was obtained by conducting experiments under the following conditions engine speed of 1400 rpm and engine load of 3 kgm. In FIG. 8, the curve d indicates the results using the same conventional engine same as used in connection with the curve c in FIG. 5; curve e in FIG. 8 indicates the results using the same engine as was used to generate the curve a in FIG. 5; and curve f of FIG. 8 indicates the results using an engine such as that shown in FIGS. 6 and 7 whose compression ratio was set at about 10 and whose squish area rate was about 24%. The graph of FIG. 8 demonstrates that the engine shown in FIGS. 6 and 7 exhibits improved fuel consumption characteristics and stable engine operating (limit beyond which engine operation becomes unstable), as compared with an engine such as that shown in FIGS. 2 and 3. Specifically, the fuel consumption of the engine corresponding to FIGS. 6 and 7 was improved by about 4% with respect to the engine corresponding to FIGS. 2 and 3 at an EGR rate of 25% as clearly shown in FIG. 8. The inventors experiments showed that the effect of the above-mentioned recesses 40 and 42 was significant when the distance between the sparking point (the point between the two electrodes) 27a, 28a of each spark plug 27, 28 and the wall surface 40a, 42a of corresponding recess 40, 42 was about 10 mm or more on an imaginary plane perpendicular to the axis of each spark plug.

Figure 9:
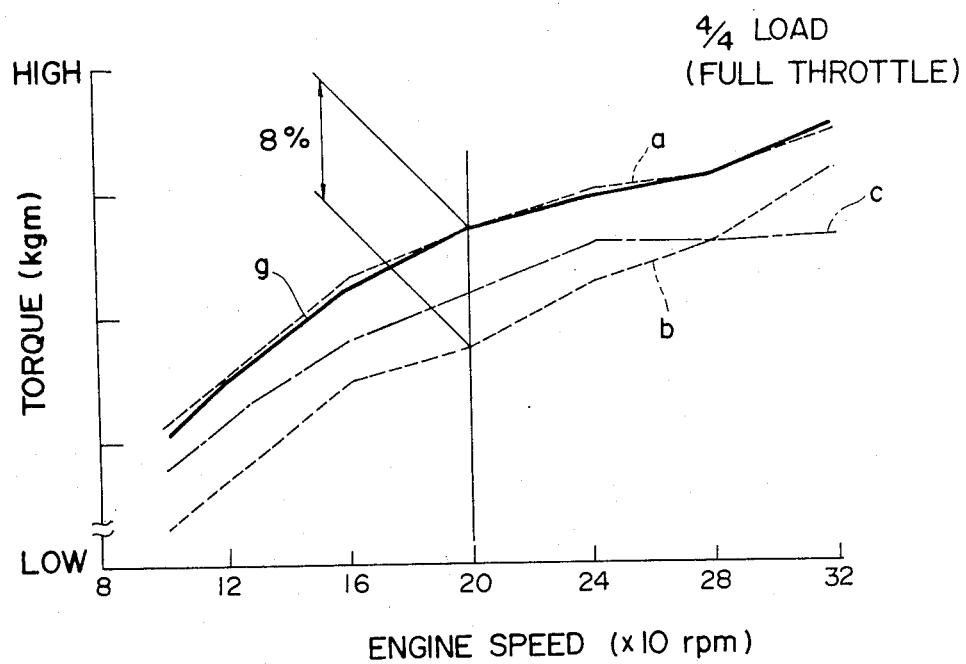
FIG. 9 is a graph showing the power output characteristics of various engines including the engine of FIG. 6.

FIG. 9 shows the engine power output characteristics of the same engines as were used to generate FIG. 5 except for a curve g, which is the experimental results using the same engine as was used to generate the curve f. The graph of FIG. 9 demonstrates that, the power output of a conventional engine with a compression ratio of 10 is generally lower than another conventional engine with a compression ratio of 8.5. This is because, in the higher compression conventional engine, engine knock unavoidably occured and it was therefore impossible to advance the spark timing. In this regard, using the engine according to the present invention, it was possible to advance the spark timing, thereby suppressing engine knock by virtue of the squish areas 34, 36, and accordingly engine power output was improved as compared with the conventional engines. It should be understood from FIG. 9, that identical knock suppressing effects were not obtained using the engine shown in FIGS. 6 and 7 (indicated by the curve g) and the engine shown in FIGS. 2 and 3 having a squish area rate (indicated of 29% by the curve a).

Figure 10:
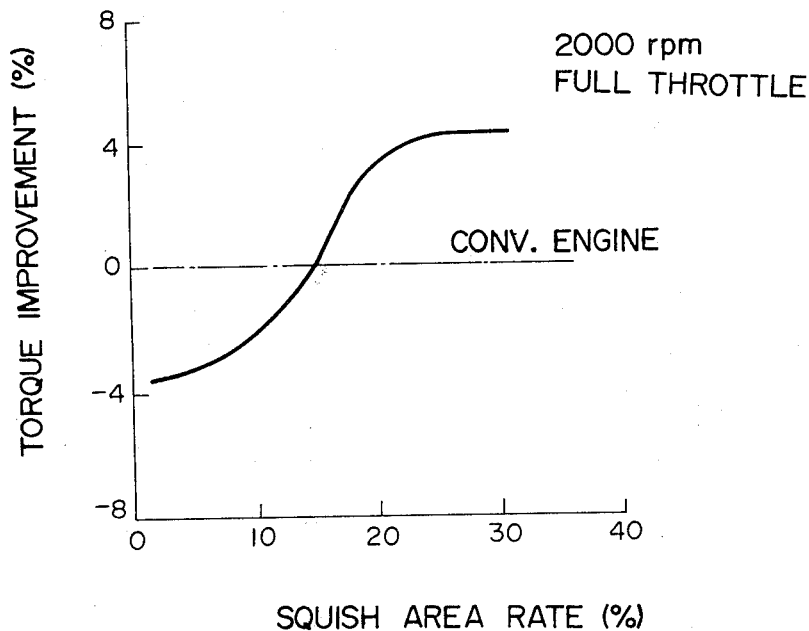
FIG. 10 is a graph showing the relationship between the engine torque improvement rate of the engine of FIG. 6 over the conventional engine and the squish area rate.

FIG. 10 shows a graph similar to that of FIG. 4. The graph of FIG. 10 was obtained by conducting experiments under similar conditions as in FIG. 4 using the same engine used to generate the curve g in FIG. 9. The graph of FIG. 10 demonstrates that the engine torque of an engine, such as that shown in FIGS. 6 and 7, like the engine shown in FIGS. 2 and 3 is greatly improved, as compared with a conventional engine having a compression ratio of 8.5. Hence, if the squish area rate is 15% or higher, engine torque can be improved even where the compression ratio is higher than usual.

Figure 11:
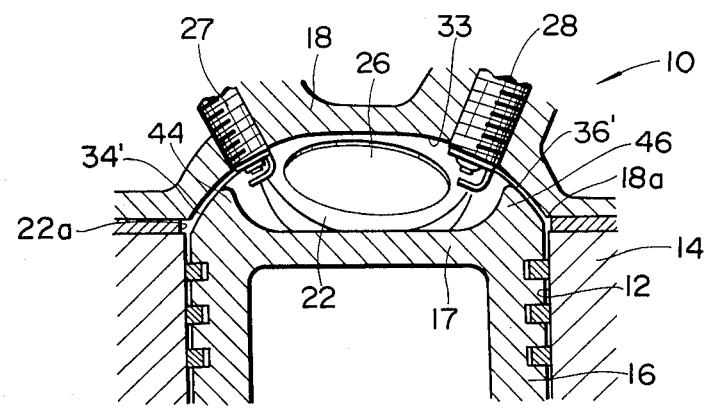
FIG. 11 is a vertical section view showing a combustion chamber construction of a modified example of the engine of FIG. 6.
Figure 12:
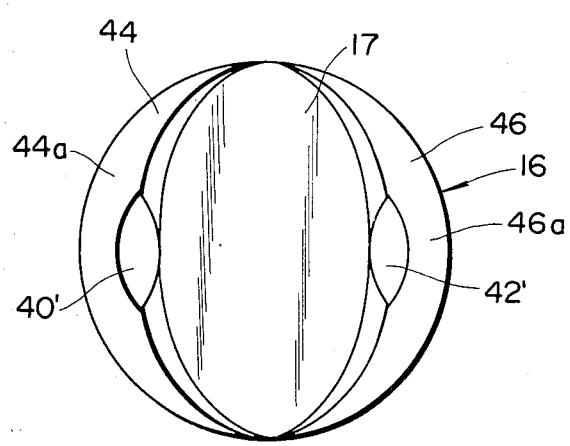
FIG. 12 is a plan view of the crown top of a piston of the engine of FIG. 11.

FIGS. 11 and 12 illustrates a modified example of the engine 10. In this example, the cylinder head 18 is formed with a generally hemispherical recess or combustion space 33 along a circular wall surface section 18a of the cylinder head 18 so that the cylinder head wall surface defining the combustion chamber 22 (referred to as a combustion chamber surface) is generally hemispherical. As shown in FIG. 12, the piston 16 is formed at its crown with two opposite projecting sections 44, 46 each of which is crescent shaped in cross-section. The projecting sections 44, 46 project upwardly to form squish surfaces 44a, 46a respectively. Two opposite squish areas 44a and 46a are formed between the combustion chamber surface and the two squish surfaces 34', 36' respectively. The two projecting sections 44 and 46 are formed with recesses 40' and 42' in the vicinity of the two spark plugs 27, 28, respectively, when the piston 16 is at its top dead center position, so that each spark plug is spaced from the wall surface of the recess 40', 42'. It will be understood that the example shown in FIGS. 11 and 12 will exhibit the same advantageous effect as in the embodiment of FIGS. 6 and 7.

As will be appreciated, according to the arrangements shown in FIGS. 6, 7, 11 and 12, to cool wall portion is present in the vicinity of a spark plug in the combustion chamber by virtue of the recess on the surface of the squish area forming projecting sections. Accordingly, sufficiently improved combustion can be obtained to take advantage of the inherent advantages of a higher compression engine even during partial load engine operating conditions such as urban area cruising. In addition, the disclosed construction suppresses engine knock to improve power output during high load engine operating conditions, thereby greatly improving fuel consumption as compared to conventional engines.

Figure 13A:
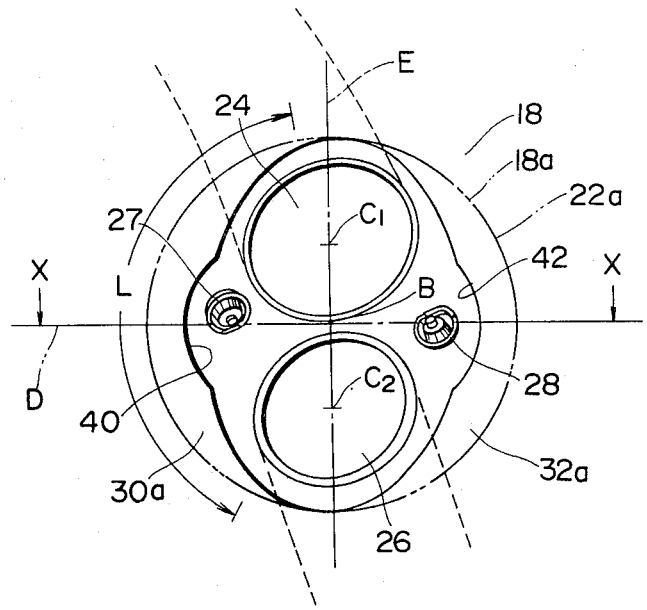
FIG. 13A is a plan view of a cylinder head bottom surface defining a combustion chamber in a third embodiment of the engine according to the present invention.
Figure 13B:
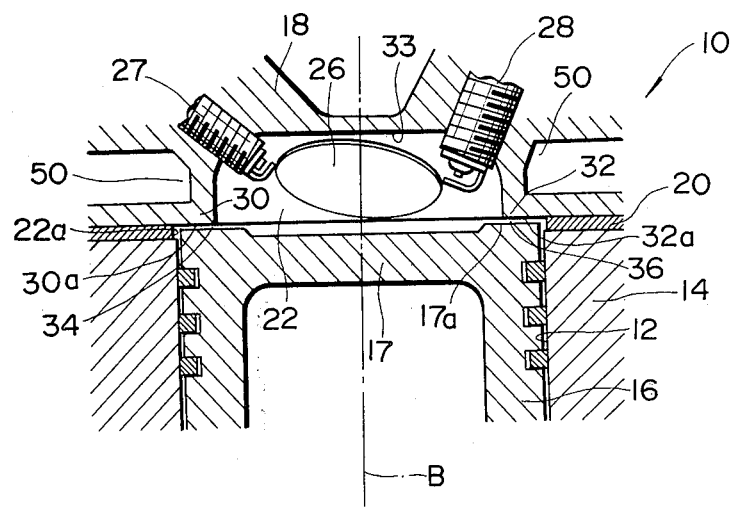
FIG. 13B is a vertical section view showing the combustion chamber construction of the engine of FIG. 13A, taken substantially along the line X—X.
Figure 14:
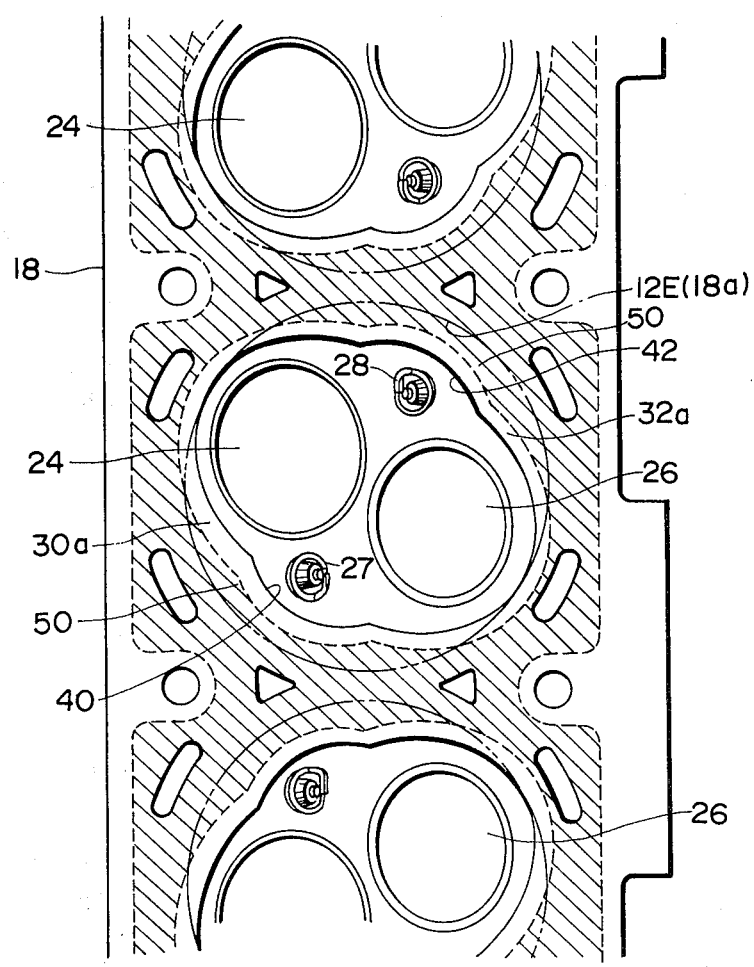
FIG. 14 is a schematic plan view of the cylinder head bottom surface showing a water jacket arrangement of the engine of FIG. 13A.
Figure 15:
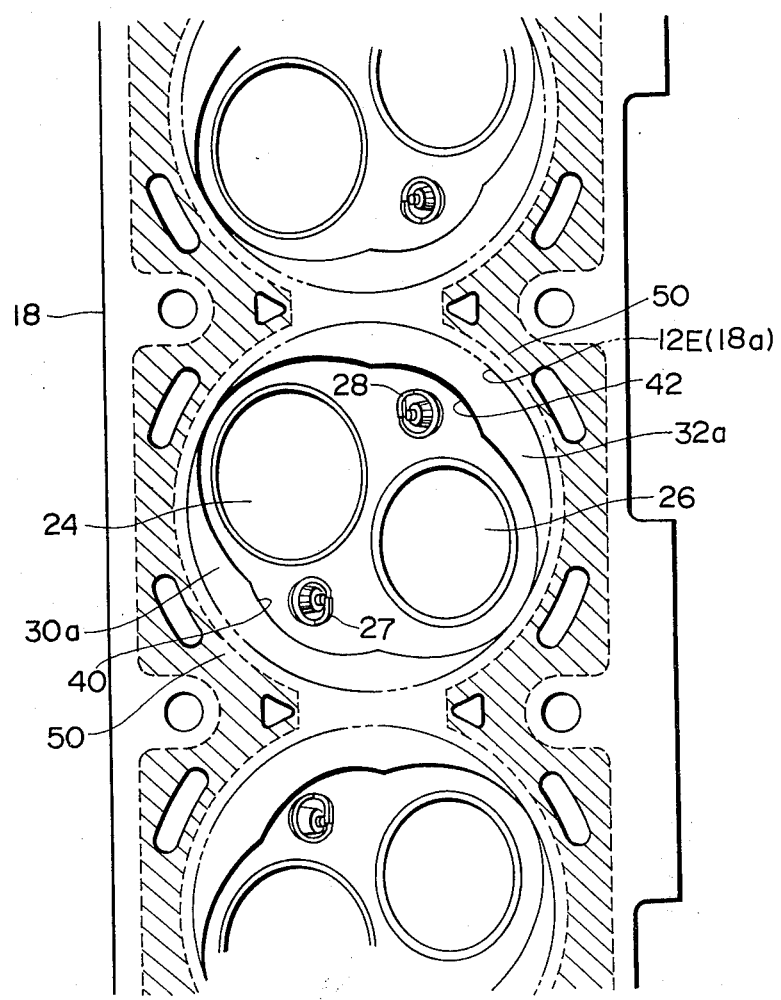
FIG. 15 is a schematic plan view similar to FIG. 14, but showing a water jacket arrangement of the conventional engine of FIG. 6.

FIGS. 13A, 13B and 14 illustrate a fourth embodiment of the engine 10 according to the present invention. In this embodiment, a water jacket or engine coolant passage 50 is formed to generally surround the combustion chamber 22, more specifically to surround the bathtub shaped combustion space 33. The water jacket 50 is indicated by an oblique-lined section in FIG. 14. As shown, a portion of the water jacket 50 is formed in the lower portions 30, 32 or squish forming portions, so that a portion of the water jacket projects beyond and to the inside of the extension 12E of the periphery of the cylinder bore 12 toward the combustion space 33. As shown in FIG. 15, the above described engines may be formed with a water jacket 50' (oblique-lined section) which does not extend to the inside of the extension 12E of the cylinder bore periphery. It will be understood that the water jacket arrangement shown in FIGS. 13B and 14 has better squish area cooling capabilities than in the water jacket 50 of FIG. 15.

With the water jacket arrangement FIGS. 13A, 13B and 14, since a portion of the water jacket 50 extends or projects above the squish surfaces 30a, 32a to effectively cool those surfaces unburned end gases contacting those surfaces are very effectively cooled and act to prevent the spontaneous ignition of the end gases before the flame front reaches the end gases. As a result, engine knock due to spontaneous ignition of end gases can be prevented. It is to be noted that the engine 10 shown in FIGS. 13A, 13B and 14 is arranged so that the compression ratio is set at a value, for example 10, higher than the conventional range of 7.5 to 9.0.

Figure 16:
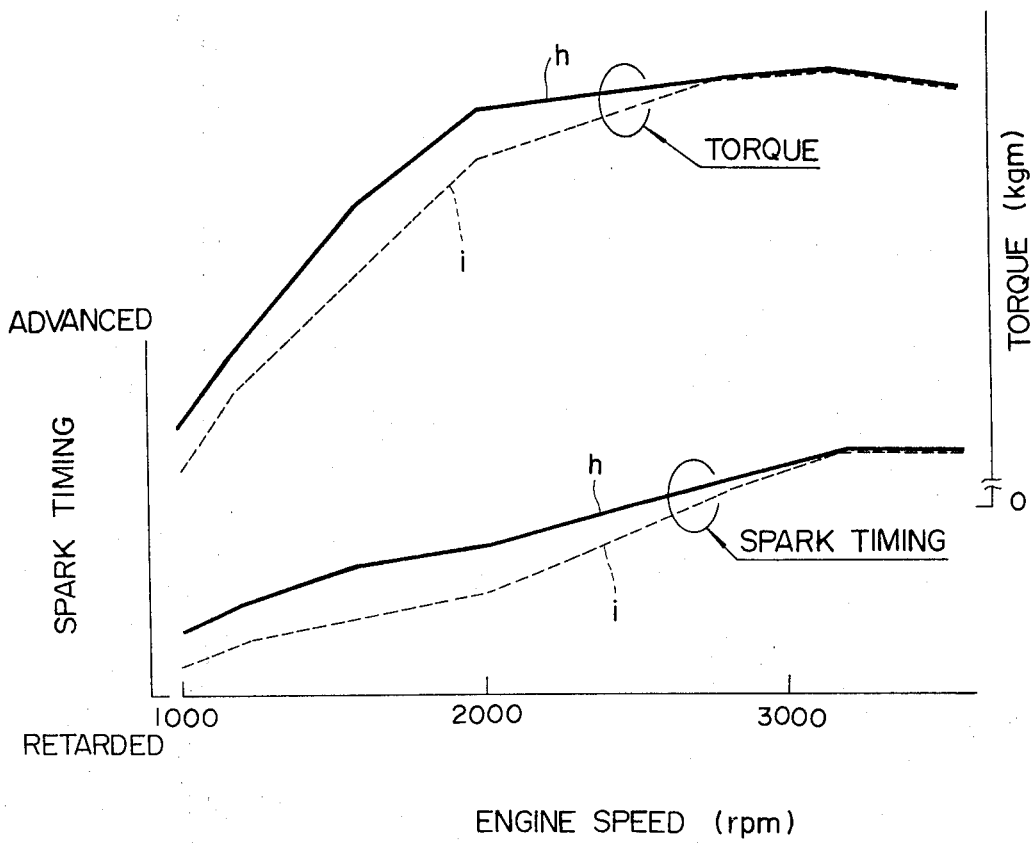
FIG. 16 is a graph showing the effect of the engine of FIG. 13A in terms of spark timing and engine torque.

FIG. 16 shows the advantageous effect obtained by the embodiment of FIGS. 13A, 13B and 14 at the trace knock level (or trace knock ignition timing), in terms of spark timing and engine torque as a function of engine speed. The graph of FIG. 16 was obtained by conducting experiments on an engine such as that shown in FIGS. 13A, 13B and 14 and having a compression ratio of 10 on an engine such as that shown in FIG. 15 having a compression ratio of 10 under full load engine operating condition (throttle valve fully opened). In FIG. 16, curves h and i indicate the experimental results using the engine corresponding to FIGS. 13A, 13B, 14 and the engine corresponding to FIG. 15, respectively. The graph demonstrates that engine knock in the engine corresponding to FIGS. 13A, 13B and 14 was effectively suppressed and consequently the spark timing of the same engine could be advanced as compared with the engine corresponding to in FIG. 15 thereby attaining higher output engine torque.

It should be understood that, in order to increase the cooling effect of the squish areas, it is preferable to render the thickness of the wall between the water jacket surface and the squish surface 30a, 32a as small as possible. The above-mentioned water jacket arrangement is applicable to engines in which the squish area is not parallel to a flat bottom surface of a cylinder head through which surface the cylinder head is secured onto a cylinder block.

As will be appreciated, according to the engine construction shown in FIGS. 13A, 13B and 14, the water jacket is so formed that its section surrounding the combustion chamber extends above the squish area, and therefore squish flow of any unburned air-fuel mixture generated in the vicinity of the end of the compression stroke of the engine can be effectively cooled. This prevents the unburned air-fuel mixture from spontaneously igniting before the flame front reaches the mixture, thereby supressing engine knock. As a result, it becomes possible to advance spark timing to improve output engine torque, greatly improving driveability and fuel consumption during high load engine operation.

Figure 17A:
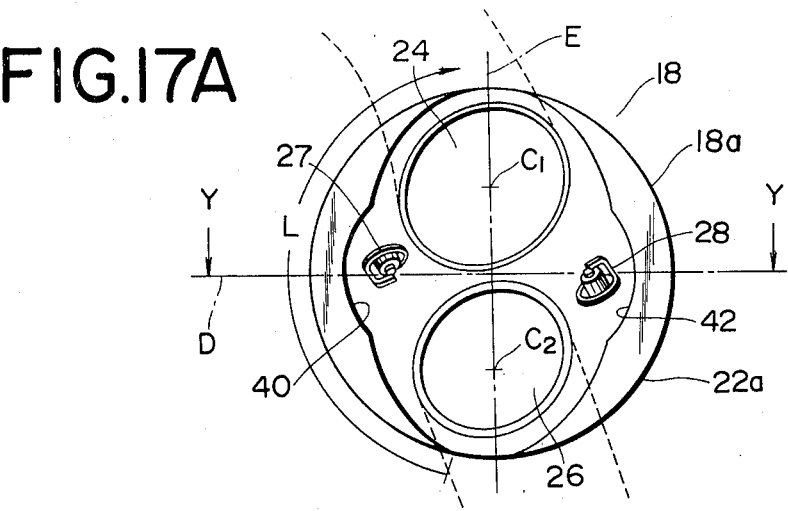
FIG. 17A is a plan view of a cylinder head bottom surface defining a combustion chamber in a fourth embodiment of the engine according to the present invention.
Figure 17B:
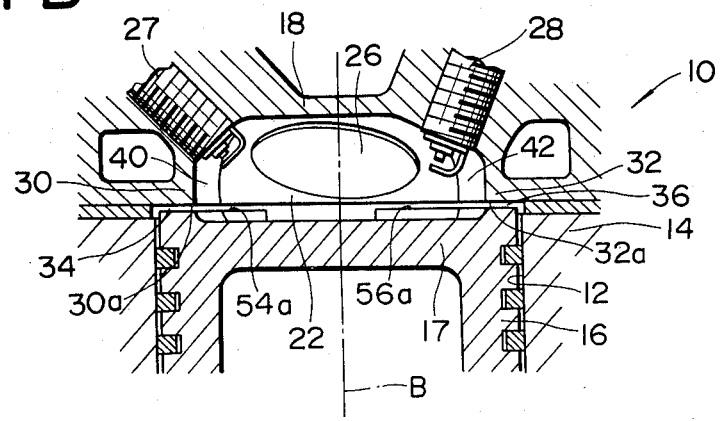
FIG. 17B is a vertical section view showing the combustion chamber construction of the engine of FIG. 17A, taken substantially along the line Y—Y of FIGS. 17A and 17C.
Figure 17C:
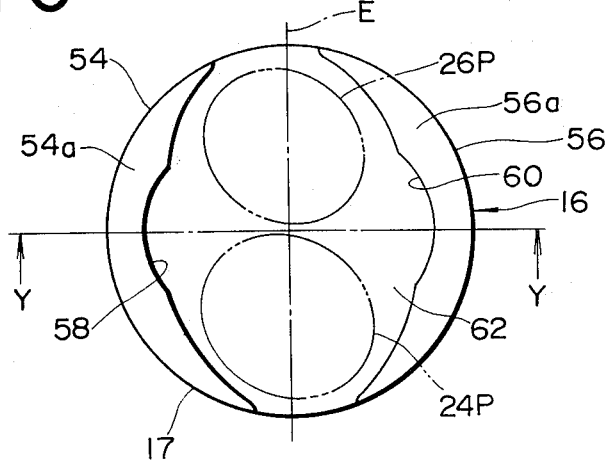
FIG. 17C is a plan view of the crown top of a piston of the engine of FIG. 17B.

FIGS. 17A, 17B and 17C illustrate a fourth embodiment of the engine in accordance with the present invention. In this embodiment, the piston 16 is formed at its crown with two raised portions or higher land sections 54 and 56 which are oppositely positioned with respect to the vertical plane E. The top surfaces 54a, 56a of the raised portions 54, 56 are formed flat and have shapes corresponding to those of the squish surfaces 30a and 32a, respectively. Accordingly, the raised portions 54 and 56 are of crescent shape and have recesses 58 and 60 whose contours correspond to recesses 40 and 42 respectively of the cylinder head 18. The surface of each recess 58, 60 is formed generally spherical. The raised portions 54 and 56 define therebetween a generally oval or plate-like shallow recess 62. It will be understood that the shallow recess 62 serves as a combustion space on the piston. The reference numerals 24P and 26P designate the projections of the intake and exhaust valves 24 and 26 when those valves are projected in the axial direction of the cylinder bore 12.

With the combustion chamber arrangement shown in FIGS. 17A, 17B and 17C, in the vicinity of the end of the compression stroke, the end gases or the unburned gases at the peripheral section of the combustion chamber are squeezed out of the squish areas 34 and 36. It is to be noted that the thus formed squish flow of unburned gases smoothly moves toward the central portion of the combustion chamber 22 without being obstructed by the top surface of the piston crown since piston crown top surface is formed with the shallow flat recess 62. Accordingly, a strong turbulence is generated in the combustion chamber 22 to promote the air-fuel mixture combustion in the combustion chamber, so that the combustion in the combustion chamber is completed before the temperature of the end gases reaches the level at which the end gases will spontaneously ignite. As a result, enging knock due to spontaneous ignition of the end gases can be effectively prevented.

Figure 18A:
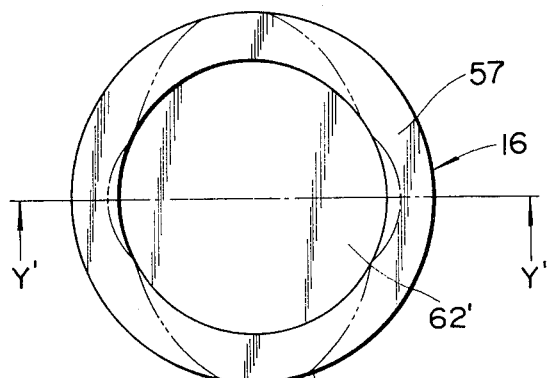
FIG. 18A is a plan view similar to FIG. 17C, but showing a modified example of the piston crown top of the engine of FIG. 17B.
Figure 18B:
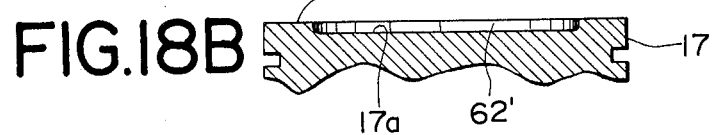
FIG. 18B is a vertical section view of the crown of the piston of FIG. 18A, taken substantially along the line Y'—Y' of FIG. 18A.

It has been observed that even if the shallow recess 62 (in FIG. 17C) are replaced with a circular flat shallow recess 62' (shown in FIG. 18A) which is formed coaxially relative to the outer periphery of the piston crown 17 by an annular raised or higher land section 57, the same advantageous effect as in the combustion chamber arrangement shown in FIGS. 17A to 17C is obtained. It is however to form the recess 62' in such a manner that its periphery contacts the inner contours of the two opposite raised portions 54, 56 of FIG. 17C as clearly shown in FIG. 18A.

Figure 19:
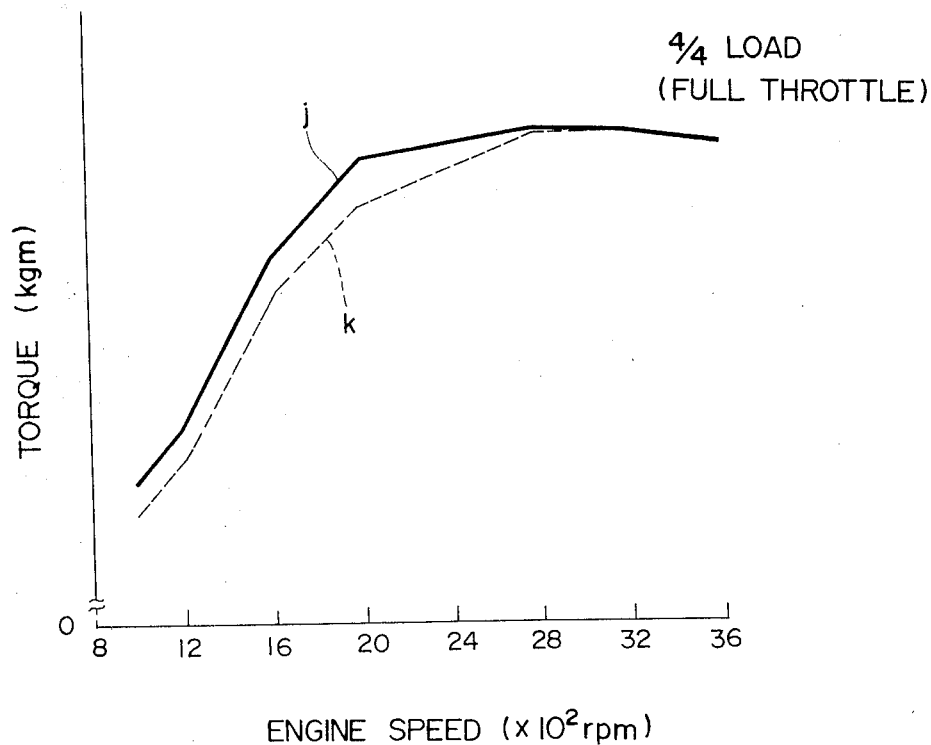
FIG. 19 is a graph showing the effect of the engine of 17A in terms of engine power output.

FIG. 19 demonstrates the advantageous effect of the embodiment of FIGS. 17A to 17C on engine torque at a spark timing corresponding to a trace knock level (or trace knock ignition timing). The engine torque was measured while varying engine speed under full load engine operating (throttle fully opened) conditions. In the graph of FIG. 19, curve j depicts the experimental results using a engine having a combustion chamber construction corresponding to FIGS. 17A to 17C and having a compression ratio of 10. Curve k depicts the using an engine having a compression ratio of 10 which is constructed that the top surface of the crown of each piston is formed flat without any projections such as the raised portions 54, 56. As seen from the graph of FIG. 19, the combustion in the combustion chamber construction corresponding to in FIGS. 17A to 17C was faster than in the engine having flat crown pistons, and therefore engine knock was suppressed to improve engine torque as compared with the flat crown piston engine.

Figure 20A:
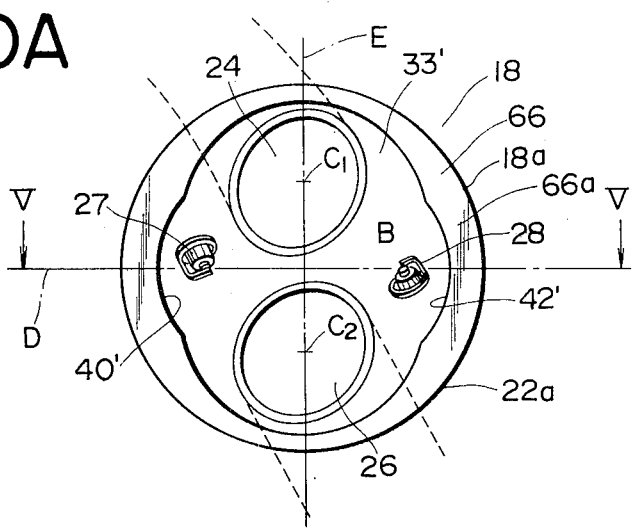
FIG. 20A is a plan view of a cylinder head bottom surface defining a combustion chamber, of a modified example of the engine of FIG. 17A.
Figure 20B:
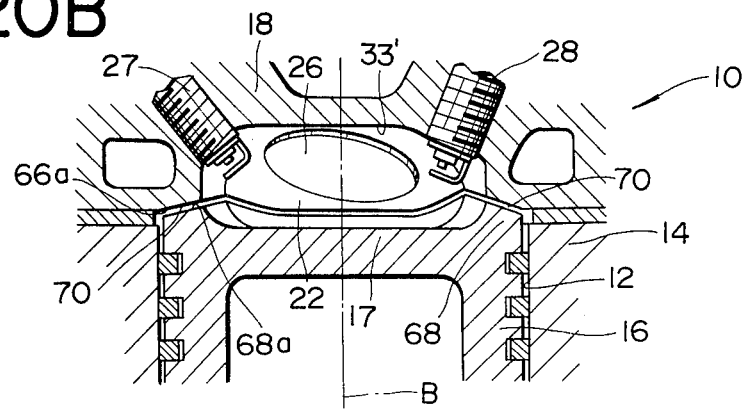
FIG. 20B is a vertical section view showing a combustion chamber construction of the engine of FIG. 20A, taken substantially along the line V—V of FIGS. 20A and 20C.
Figure 20C:
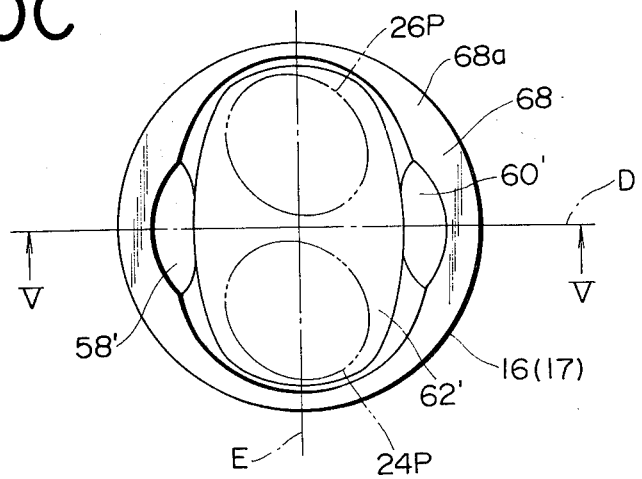
FIG. 20C is a plan view of the crown top of a piston of FIG. 20B.

FIGS. 20A, 20B and 20C illustrate a modified example of the fifth embodiment of the engine in accordance with the present invention. In this embodiment, the cylinder head 18 is formed with generally annular lower portion 66 along the periphery of the circular wall surface section 18a defined by the periphery of the cylinder bore 12, defining the bathtub shaped combustion space 33' at the central section of the circular section 18a. The annular lower portion 66 has two recesses 40' and 42' which are positioned opposite to each other with respect to the vertical plane E, and in the vicinity of the spark plugs 27 and 28, respectively. Each of the recesses 40', 42' has a generally spherical surface similar to that of the recess 40, 42 in the embodiment of FIGS. 17A, 17B and 17C. The piston 16 is formed with a generally annular raised portion 68 which is located along the periphery of the piston crown 17, defining an oval shaped or plate like shallow recess 62' at the central section of the piston crown surface. The raised portion 68 has two recesses 58' and 60' which are positioned opposite to each other with respect to the vertical plane E, and positioned in the vicinity of the spark plugs 27 and 28, respectively, when the piston 16 is at the top dead center position. Each of the recesses 58' and 60' extends radially and outwardly and has a generally spherical surface. The shapes of the recesses 58' and 60' are similar to those of the recesses 58 and 60 of the embodiment shown in FIGS. 17A to 17C. As shown, the bottom surface or squish surface 66a of the lower position 66 of the cylinder head 18 is inclined lower in the radial and outward direction thereof. Similarly, the top surface or squish surface 68a of the raised portion 68 is also inclined lower in the radial and outward direction thereof, so that the inclined squish surface 68a of the piston raised portion 68 is parallel with the squish surface 66a of the cylinder head lower portion 66, thereby forming therebetween an annular squish area 70 which is of a generally flat frustoconical shape when the piston is at its top dead center position.

With such a combustion chamber construction, the squish flow of air-fuel mixture is generated toward the squish area by virtue of the generally frustoconically shaped squish area in the vicinity of the end of the compression stroke of the engine. The thus generated squish flow can be smoothly ejected to move towards the center of the combustion space 33' without being obstructed by the cylinder head or piston surfaces. Consequently, a stronger swirl turbulence is formed in the combustion chamber to obtain faster combustion, thereby further effectively suppressing engine knock.

As will be appreciated, according to the embodiment shown in FIGS. 17A to 17C and 20A to 20C, since a shallow recess is formed on the top surface of the piston crown, the squish flow generated by the squish area is smoothly ejected toward the center of the combustion chamber without being obstructed by the combustion chamber wall surface. This produces a strong turbulence in the combustion chamber to obtain faster combustion of air-fuel mixture, thereby further improve engine knock preventing effect due to the squish turbulence.

Figure 21:
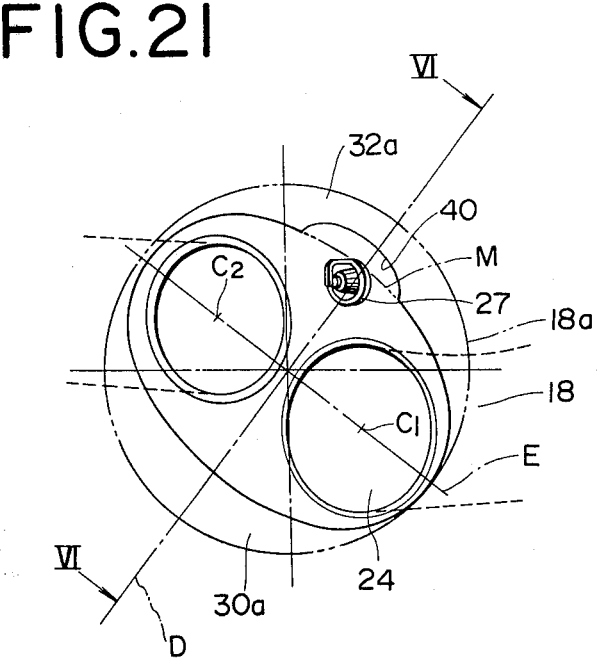
FIG. 21 is a plan view of a cylinder head bottom surface defining a combustion chamber, of a fifth embodiment of the engine according to the present invention.
Figure 22:
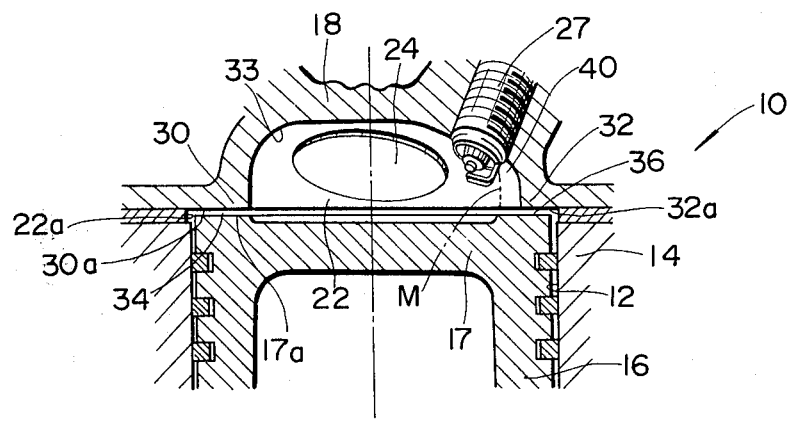
FIG. 22 is a vertical section view showing a combustion chamber construction of the engine of FIG. 21, taken substantially along the line VI—VI of FIG. 21.

FIGS. 21 and 22 illustrate a sixth embodiment of the engine in accordance with the present invention. This embodiment is similar to that shown in FIGS. 6 and 7 with the exception that a single spark plug is disposed in the combustion chamber 22. The single spark plug is positioned in a manner similar to the spark plug 27 of FIG. 6 and is therefore designated by the reference numeral. In this connection, lower portion 32 of the cylinder head 18 is formed with recess 40 in the vicinity of the spark plug 27. The opposite lower portion 30 is formed without any such recess as clearly shown in FIG. 21 since no spark plug is provided in the vicinity of the central section of the lower portion 30. It is noted that this engine 10 is so arranged that the volume of the combustion chamber 22 is relatively small so that the compression ratio of the engine is higher than the conventional a range from about 7.5 to 9.0 and accordingly is set at about 10 in this embodiment.

In operation of the arrangement shown in FIGS. 21 and 22, when the piston 16 nears its top dead center position, squish areas 34, 36 are formed between the squish surfaces 30a, 32a and the piston crown top surface 17a. Consequently, in the vicinity of the end of compression stroke, the end gases residing near the combustion chamber periphery 22a are squeezed out of the squish areas 34 and 36. Squish gases flow toward the center of the combustion chamber, thereby producing a so-called squish turbulence in the combustion chamber. This increases the combustion rate of air-fuel mixture in the combustion chamber 22. Additionally, since the generally spherical recess 40 is formed in the vicinity of the spark plug 27, no low temperature wall portion exist near the spark plug which could prevent good flame propagation or flame front movement in the combustion chamber. Accordingly, flame front movement is smoothly and effectively carried out to obtain good combustion in the combustion chamber. Experiments have demonstrated that the above-discussed effect of the recess 40 is significant within the low load engine operating range frequently encountered during normal or usual vehicle cruising.

Figure 23:
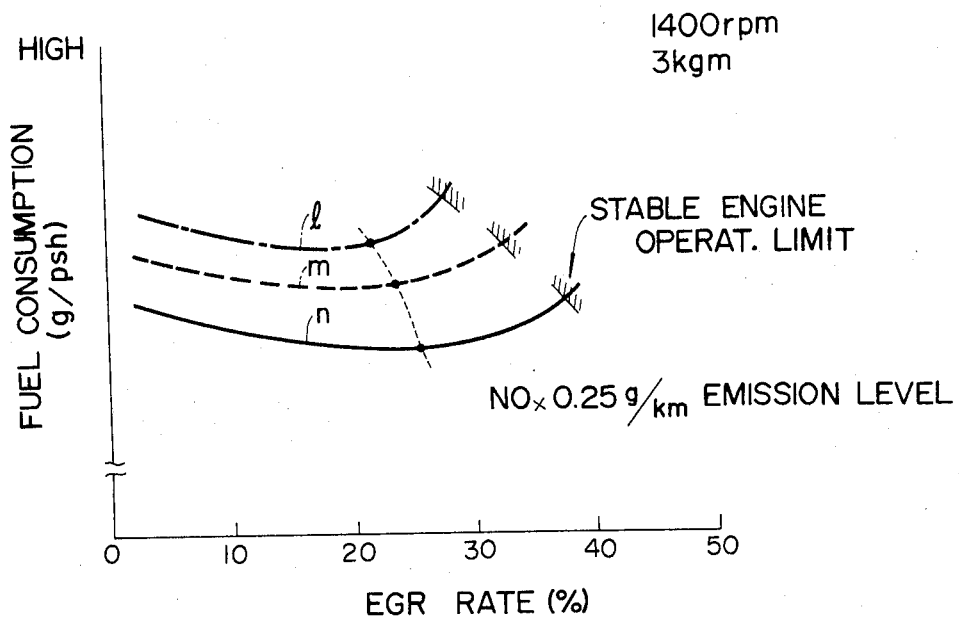
FIG. 23 is a graph showing the fuel consumption characteristics of the engines including the engine of FIG. 21 during partial load engine operation.
Figure 28:
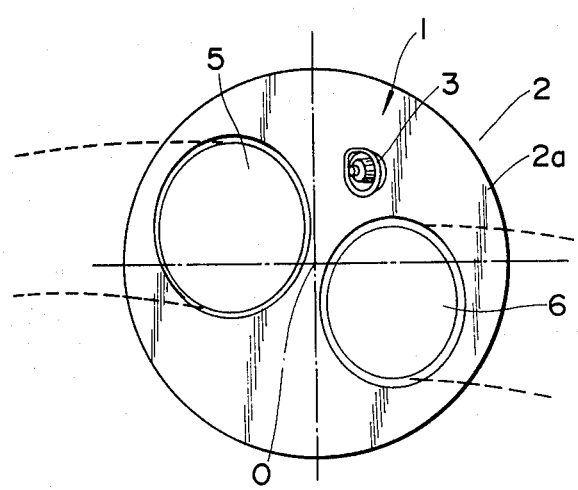
FIG. 28 is a plan view similar to FIG. 1, but showing a cylinder head bottom surface defining a combustion chamber, of a conventional single spark plug ignition engine.

FIG. 23 depicts experimental result of fuel consumption (g/psh) tests at engine operating conditions corresponding to low load engine operation or a steady state vehicle crusing at 40 Km/h as a function of variation of EGR rate. The graph of FIG. 23 was obtained by conducting experiments under the conditions comprising an engine speed of 1400 rpm and an engine load of 3 Kgm. In this graph, curve 1 indicates results obtained from a conventional engine having a compression ratio 8.5 whose combustion chamber construction is shown in FIG. 28; curve m depicts result obtained from an engine having a compression ratio of 10 and a squish area rate of 29% and whose combustion chamber was similar to the construction shown in FIG. 21 but having no recess 40 as indicated by phantom line M; and curve n indicates the result obtained from an engine having a compression ratio of 10 and a construction as shown in FIGS. 21 and 22. As indicated by FIG. 23, by using the combustion chamber construction shown in FIGS. 21 and 22, a great improvement in fuel consumption and stable engine operating limit can be obtained as compared with the conventional engine shown in FIG. 28, thereby exhibiting the advantageous effects using the higher compression ratio engine. Improvement to a lesser degree was also exhibited with the engine which was not provided with the recess 40 shown in FIG. 21 as compared to the conventional engine.

Furthermore, with the combustion chamber construction shown in FIGS. 21 and 22, the temperature of the end gases near the combustion chamber periphery is maintained lower by virtue of the relatively low temperature squish surfaces 30a, 32a and piston crown top surface 17a even during high load engine operation. This can prevent the unburned end gases from spontaneously igniting before the flame front reaches the end gases, to thereby prevent lowering of the output engine torque due to engine knock.

Figure 24:
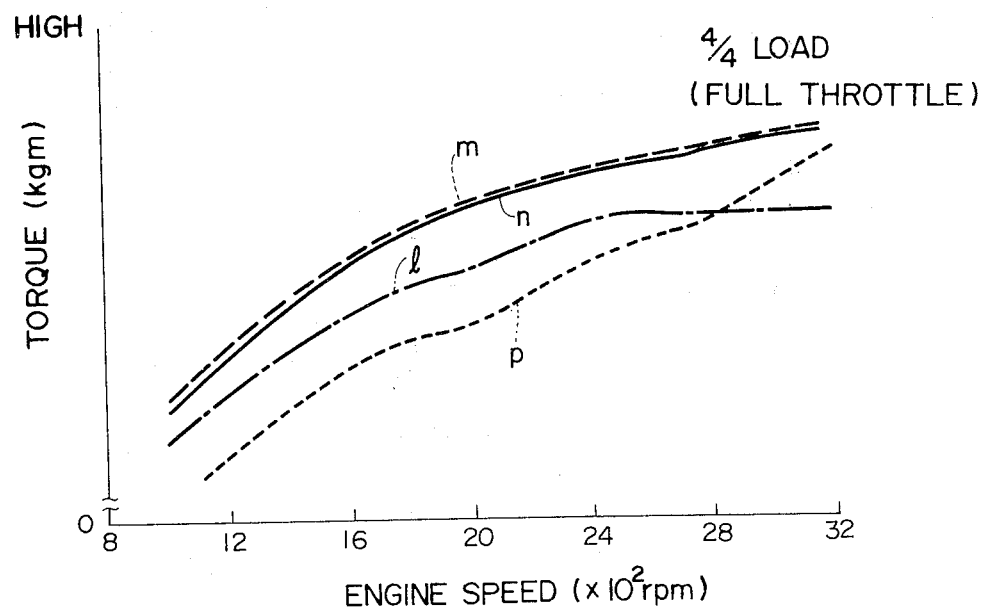
FIG. 24 is a graph showing engine power output of the engines including the engine of FIG. 21 during high load engine operation.
Figure 26:
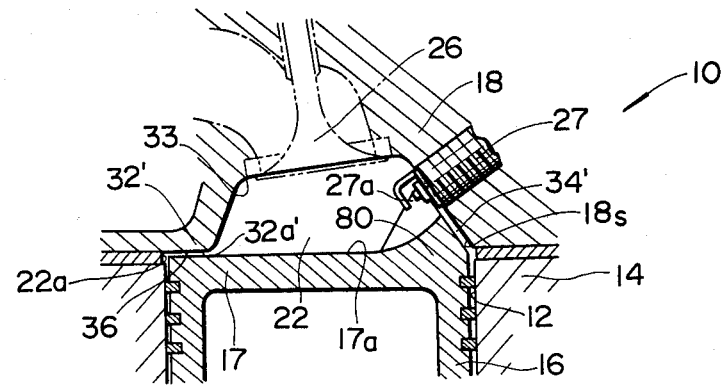
FIG. 26 is a vertical section view showing a combustion chamber construction of the engine of FIG. 25.

In this connection, FIG. 24 shows the brake torque characteristics at the trace knock level (or trace knock ignition timing) for high load engine operation, of the engine used in the experiment of FIG. 23 as compared to an engine whose combustion chamber construction corresponds to FIG. 26 and whose compression ratio was 10. In FIG. 24, the same alphabetic characters used in FIG. 23 are used to indicate the results from corresponding engines. The engine indicated by the curve n has, in its combustion chamber, squish areas whose squish area rate is 26%. The graph of FIG. 24 shows that the engine torque of the higher compression conventional engine was considerably lowered as compared with the usual compression ratio conventional engine. This is because, in the higher compression ratio conventional engine, engine knock unavoidably occured and accordingly it was impossible to advance the spark timing. In this connection, in the engines having squish areas in the combustion chamber, it was possible to advance the spark timing by virtue of the considerable squish areas, thereby attaining engine torque improvement and engine knock suppressing effects. This advantageous effect was confirmed to result from the squish turbulence due to the squish areas. Additionally, experiments have revealed that the engine knock preventing effect of the squish area was obtained when the squish area rate was 15% or higher.

Figure 25:
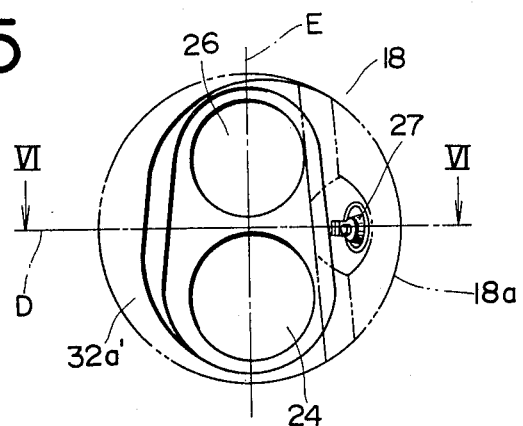
FIG. 25 is a plan view of a cylinder head bottom surface defining a combustion chamber, of a modified example of the engine of FIG. 21.
Figure 27:
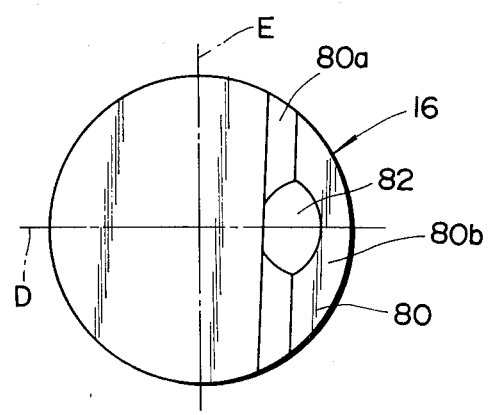
FIG. 27 is a plan view of the crown top of a piston of the engine of FIG. 26.

FIGS. 25, 26 and 27 illustrate a modified example of the fifth embodiment. In this example, the cylinder head 18 is formed with a generally crescent shaped (in cross-section) lower portion 32' along the combustion chamber periphery 22a. A squish area 36' is formed between the bottom surface or squish surface 32a' and the piston crown top surface 17a. The piston 16 is formed at its crown surface with an elongate projection or ridge 80 which has flat inner and outer slope surfaces 80a and 80b. The outer slope surface 80b is generally parallel and approaches the inclined cylinder head surface 18s defining the combustion chamber when the piston 16 is at the top dead center position, the spark plug 40 being located on the cylinder head surface 18s. Accordingly, a squish area 34' is formed between the outer slope surface 80b of the piston crown projection 80 and the cylinder head inclined surface 18s. Therefore, the squish areas 34', 36' are positioned generally opposite to each other with respect to the vertical plane E. Additionally, the piston crown projection 80 is formed on its inner slope surface 80a with a recess 82 having a generally spherical surface. The recess 82 is positioned near the spark plug 40 when the piston is at the top dead center position, and accordingly the surface of the piston crown projection 80 is spaced from the sparking point 27a of the spark plug 40 in order that the combustion initiated at the spark plug is not prevented from sparking by the relatively cool surface of the piston crown projection 80. It should be understood that this modified example shown in FIGS. 25 and 27 exhibits the same advantageous effect as the embodiment of FIGS. 21 and 22.

As will be appreciated, according to the engine construction shown in FIGS. 21, 22 and 25 to 27, a pair of squish areas are formed in the combustion chamber and additionally a recess is formed at a projecting section defining one of squish areas to separate the projecting section surface from the spark plug. This arrangement acts to suppress engine knock during high load engine operation and to improve engine power output, and to provide good combustion in the combustion chamber to sufficiently exhibit the inherent effects of higher compression ratio engines, thereby greatly improving the fuel consumption characteristics of the engine.

While the explanation of the invention has been shown and described to be made on the higher compression ratio engines, it will be understood that the principle of the present invention is applicable on engines having usual compression ratio and equipped with a supercharger, wherein the same advantageous effect as in the above-mentioned embodiment will be obtained.

What is claimed is:

1. A spark-ignition internal combustion engine having a cylinder with a cylinder bore and an axis defining the center of said bore, comprising:
    a piston reciprocally disposed in the cylinder;
    a cylinder head having a wall surface closing an end of said cylinder bore and defining a combustion chamber between said wall surface and the piston;
    intake and exhaust valves disposed on said wall surface and positioned generally symmetrically with respect to an extension of said center axis of the cylinder bore, said intake and exhaust valves having centers disposed in a first vertical plane which defines first and second sections of the combustion chamber on opposite sides thereof;
    means defining first and second squish areas located respectively in said first and second sections of the combustion chamber, said first and second squish areas defining means including first and second projecting wall portions, respectively, which project from and are integral with said cylinder head, and which respectively have first and second sidewall portions extending generally parallel to said center axis, to define the combustion chamber;
    a first spark plug having a tip disposed in said first section of the combustion chamber and located in the vicinity of said first projecting wall portion;
    means defining a first recess at a surface of said first projecting wall portion in the vicinity of said first spark plug, the surface of said recess being spaced from the tip of said spark plug whereby flame propagation from the tip of said first spark plug is substantially unobstructed by the surface of said first projecting wall portion;
    a second spark plug having a tip disposed in said second section of the combustion chamber and located in the vicinity of said second projecting wall portion;
    means defining a second recess at a surface of said second projecting wall portion in the vicinity of said second spark plug whereby flame propagation from the tip of said second spark plug is substantially unobstructed by the surface of said second projecting wall portion;
    the surfaces of said first and second recesses extending generally radially outward and generally parallel to the sidewalls of said first and second projecting wall portions, respectively, and towards an end of said wall portions in a central region thereof.

2. A spark-ignition internal combustion engine as claimed in claim 1, wherein said engine has a compression ratio value higher than 9.0.

3. A spark-ignition internal combustion engine as claimed in claim 2, wherein said first and second squish areas have a total cross-sectional area of at least 15% of that of the cylinder bore.

4. A spark-ignition internal combustion engine as claimed in claim 2, wherein said value is about 10.

5. A spark-ignition internal combustion engine as claimed in claim 1, wherein said second spark plug being positioned so that its tip lies generally opposite the tip of said first spark plug with respect to the extension of the cylinder bore center axis, the tips of said first and second spark plugs being located on a second vertical plane which crosses the first vertical plane at right angles.

6. A spark-ignition internal combustion engine as claimed in claim 5, wherein said first and second projecting wall portions include first and second lower portions of said cylinder head respectively and are located in the first and second sections of the cylinder bore and disposed opposite to each other with respect to the first vertical plane, each of said first and second lower portions having a bottom surface which generally conforms to a top surface of a piston crown to form therebetween the squish area.

7. A spark-ignition internal combustion engine as claimed in claim 6, wherein said first and second lower portions are formed with first and second recesses in the vicinity of first and second spark plugs, respectively, the surface of each recess facing to the tip of the corresponding spark plug whereby the surfaces of said lower portions are spaced from the spark plug tips.

8. A spark-ignition internal combustion engine as claimed in claim 7, wherein the distance between the surface of each recess and the sparking point of the corresponding spark plug is at least about 10 mm on a plane perpendicular to the axis of said spark plugs.

9. A spark-ignition internal combustion engine as claimed in claim 7, wherein each of said first and second lower portions of said cylinder head has a crescent shape with an inner and outer contour as viewed from the cylinder bore center axis, the outer contour of each crescent shape lower portion being positioned along a periphery of the combustion chamber, the width of said crescent being a maximum at a central section located on the second vertical plane.

10. A spark-ignition internal combustion engine as claimed in claim 9, wherein the outer contour of said crescent shape has a length within a range of from about ⅓ to ½ that of the peripheral length of the cylinder bore.

11. A spark-ignition internal combustion engine having a cylinder with a cylinder bore and an axis defining the center of said bore, comprising:
- a piston reciprocally disposed in the cylinder;
- a cylinder head having a wall surface closing an end of said cylinder bore and defining a combustion chamber between said wall surface and the piston;
- intake and exhaust valves disposed on the wall surface and positioned generally symmetrically with respect to an extension of the center axis of the cylinder bore, said intake and exhaust valves having centers disposed in a first vertical plane which defines first and second sections of the combustion chamber on opposite sides thereof;
- means for defining first and second squish areas located respectively in said first and second sections of the combustion chamber including first and second projecting wall portions integral with said cylinder head, and which respectively have first and second sidewall portions extending generally parallel to center axis and formed with a squish surface facing a crown of said piston to define therebetween said first and second squish areas;
- a first spark plug having a tip projecting into said first section of the combustion chamber and being located in the vicinity of said first projecting wall portion;
- means defining a first recess at a surface of said first projecting wall portion in the vicinity of said first spark plug, the distance between the surface of said first projecting wall portion and said tip being not less than about 10 mm on a plane perpendicular to the axis of said first spark plug;
- a second spark plug having a tip projecting into said section of the combustion chamber and being located in the vicinity of said second projecting wall portion; and
- means defining a second recess at a surface of said second porjecting wall portion in the vicinity of said second spark plug, the distance between the surface of said first projecting wall portion and said tip being not less than about 10 mm on a plane perpendicular to the axis of said second spark plug;
- the surfaces of said first and second recesses extending generally radially outward and generally parallel to the sidewalls of said first and second projecting wall portions, respectively, and towards an end of said wall portions in a central region thereof.

* * * * *